United States Patent
Morishima (10) Patent No.: US 12,436,351 B2
(45) Date of Patent: Oct. 7, 2025

(54) OPTICAL FIBER RIBBON, OPTICAL FIBER CONNECTION COMPONENT, AND METHOD FOR MANUFACTURING OPTICAL FIBER CONNECTION COMPONENT

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 221 days.

(21) Appl. No.: 18/038,131

(22) PCT Filed: Dec. 22, 2021

(86) PCT No.: PCT/JP2021/047692
§ 371 (c)(1),
(2) Date: May 22, 2023

(87) PCT Pub. No.: WO2022/138761
PCT Pub. Date: Jun. 30, 2022

(65) Prior Publication Data
US 2023/0367092 A1   Nov. 16, 2023

(30) Foreign Application Priority Data

Dec. 25, 2020   (JP) ................ 2020-217224

(51) Int. Cl.
*G02B 6/44*   (2006.01)
*G02B 6/02*   (2006.01)
*G02B 6/024*   (2006.01)

(52) U.S. Cl.
CPC ......... *G02B 6/448* (2013.01); *G02B 6/02042* (2013.01); *G02B 6/024* (2013.01)

(58) Field of Classification Search
CPC ...... G02B 6/4403; G02B 6/448; G02B 6/024; G02B 6/02042
See application file for complete search history.

(56) References Cited

U.S. PATENT DOCUMENTS 5,333,229 A * 7/1994 Sayegh ................ G02B 6/4403
385/11
2015/0247980 A1   9/2015 Bradley et al.
(Continued)

FOREIGN PATENT DOCUMENTS

| EP | 2 799 920 A1 | 11/2014 |
|---|---|---|
| JP | 2003-344735 A | 12/2003 |

(Continued)

OTHER PUBLICATIONS

Translation of JP-2017173514-A (Year: 2017).*

*Primary Examiner* — Chad H Smith
(74) *Attorney, Agent, or Firm* — Oliff PLC (57) ABSTRACT

An optical fiber ribbon includes a plurality of optical fibers each including a glass fiber including a core and a cladding covering the core, and a resin coating covering the glass fiber, the plurality of optical fibers being arranged in parallel. In the optical fiber ribbon, a distance between central axes of adjacent optical fibers among the plurality of optical fibers in a direction orthogonal to a longitudinal direction of the plurality of optical fibers is larger than an outer diameter of each of the plurality of optical fibers.

6 Claims, 11 Drawing Sheets

(56) References Cited

U.S. PATENT DOCUMENTS

| | | |
|---|---|---|
| 2016/0223774 A1 | 8/2016 | Bennett et al. |
| 2016/0252683 A1* | 9/2016 | Sasaki et al. |
| 2017/0285287 A1* | 10/2017 | Murata ............ B29D 11/00721 |
| 2017/0299830 A1* | 10/2017 | Kokura ................ G02B 6/4478 |

FOREIGN PATENT DOCUMENTS

| | | | |
|---|---|---|---|
| JP | 2010-224478 A | | 10/2010 |
| JP | 2015-125172 A | | 7/2015 |
| JP | 2017173514 A | * | 9/2017 |
| JP | 2020-038255 A | | 3/2020 |
| WO | 2013/099555 A1 | | 7/2013 |
| WO | 2020/179513 A1 | | 9/2020 |

\* cited by examiner

OPTICAL FIBER RIBBON, OPTICAL FIBER CONNECTION COMPONENT, AND METHOD FOR MANUFACTURING OPTICAL FIBER CONNECTION COMPONENT

TECHNICAL FIELD

The present disclosure relates to an optical fiber ribbon, an optical fiber splicing component, and a method for manufacturing an optical fiber splicing component.

The present application claims priority from Japanese Patent Application No. 2020-217224 filed on Dec. 25, 2020, contents of which are incorporated by reference in its entirety.

BACKGROUND ART

Patent Literature 1 discloses a method for manufacturing an optical connector including multi-core fibers. According to the manufacturing method disclosed in Patent Literature 1, after the multi-core fiber is disposed in a V groove provided in a connector ferrule, a posture of the multi-core fiber around a central axis is adjusted (that is, the multi-core fiber is rotationally aligned). Patent Literature 2 discloses an optical fiber ribbon including a plurality of multi-core fibers in each of which a core is disposed in a predetermined orientation. In the optical fiber ribbon disclosed in Patent Literature 2, adjacent multi-core fibers are intermittently bonded to each other along a longitudinal direction of the optical fiber ribbon.

CITATION LIST

Patent Literature

Patent Literature 1: JP2015-125172A
Patent Literature 2: JP2017-173514A

SUMMARY OF INVENTION

An optical fiber ribbon of the present disclosure includes a plurality of optical fibers each including a glass fiber including a core and a cladding covering the core, and a resin coating covering the glass fiber. The plurality of optical fibers are arranged in parallel. A distance between central axes of adjacent optical fibers among the plurality of optical fibers in a direction orthogonal to a longitudinal direction of the plurality of optical fibers is larger than an outer diameter of each of the plurality of optical fibers.

An optical fiber splicing component using the optical fiber ribbon is also provided.

A method for manufacturing an optical fiber splicing component according to the present disclosure includes: a step of separating the plurality of optical fibers in the optical fiber ribbon according to present disclosure; a step of exposing end portions of the plurality of glass fibers from the resin coating; a step of mounting the plurality of glass fibers exposed from the resin coating on a holding member; and a step of adjusting a posture of each of the plurality of optical fibers around the central axis.

DESCRIPTION OF EMBODIMENTS

Problems to be Solved by Present Disclosure

In a case in which the optical connector is manufactured by using the optical fiber ribbon including the multi-core fibers, after the multi-core fibers are separated in a tip region of the optical fiber ribbon, the separated multi-core fibers are mounted on the connector ferrule. Thereafter, after each of the multi-core fibers is rotationally aligned, the multi-core fiber and the connector ferrule are fixed by an adhesive. Thereafter, an end surface of the multi-core fiber protruding from the connector ferrule is polished such that the end surface of the multi-core fiber and an end surface of the connector ferrule are flush with each other.

However, when the multi-core fiber in the optical fiber ribbon is rotationally aligned, the multi-core fiber may come into contact with the adjacent multi-core fiber on which rotational alignment has already been performed, and a posture of the adjacent multi-core fiber around a central axis (specifically, a position of the core located on the end surface) may fluctuate. As described above, accuracy of the rotational alignment of each multi-core fiber is lowered by the contact between the adjacent multi-core fibers at the time of a rotational alignment step. As a result, a coupling loss between the multi-core fiber and an external optical device increases, and an optical characteristic of the optical connector deteriorates. As described above, there is room for study on an optical fiber ribbon capable of improving an optical characteristic of an optical fiber splicing component such as an optical connector from the above viewpoint.

Description of Embodiments

Embodiments will be described.

(1) An optical fiber ribbon including: a plurality of optical fibers each including a glass fiber including a core and a cladding covering the core, and a resin coating covering the glass fiber, the plurality of optical fibers being arranged in parallel, in which a distance between central axes of adjacent optical fibers among the plurality of optical fibers in a direction orthogonal to a longitudinal direction of the plurality of optical fibers is larger than an outer diameter of each of the plurality of optical fibers.

According to the above configuration, when an optical fiber splicing component such as an optical connector is manufactured by using the optical fiber ribbon, it is possible to perform rotational alignment of each optical fiber (adjustment of a posture of each optical fiber around a central axis) with high accuracy. In particular, when rotational alignment of a predetermined optical fiber is performed, the predetermined optical fiber is prevented from coming into contact with the adjacent optical fiber on which the rotational alignment has already been performed. In this way, it is possible to prevent a situation in which the posture of the adjacent optical fiber around the central axis (specifically, a position of a core on an end surface of the adjacent optical fiber) fluctuates. Accordingly, it is possible to provide the optical fiber ribbon capable of improving an optical characteristic of the optical fiber splicing component.

(2) The optical fiber ribbon according to item (1), in which each of the plurality of optical fibers is a multi-core fiber or a polarization maintaining fiber.

When the optical fiber is the multi-core fiber or the polarization maintaining fiber, accuracy of the rotational alignment of each optical fiber is important when the optical fiber splicing component such as an optical connector is manufactured using the optical fiber ribbon. In this regard, according to the optical fiber ribbon of the present embodiment, the rotational alignment of each optical fiber can be performed with high accuracy.

(3) The optical fiber ribbon according to item (1) or (2), in which the adjacent optical fibers are intermittently bonded to each other in the longitudinal direction.

According to the above configuration, since the adjacent optical fibers are intermittently bonded to each other in the longitudinal direction, when the optical fiber splicing component such as an optical connector is manufactured using the optical fiber ribbon, the optical fibers can be easily separated from each other. Further, when the optical fiber is rotated around the central axis, a twist occurring in the optical fiber can be moderated. Further, since the plurality of optical fibers are arranged with gaps in the direction orthogonal to the longitudinal direction, when the rotational alignment of the predetermined optical fiber is performed, the predetermined optical fiber is prevented from coming into contact with the adjacent optical fiber on which the rotational alignment has already been performed.

(4) The optical fiber ribbon according to item (3), in which the adjacent optical fibers are intermittently bonded to each other at an interval of 10 mm or more in the longitudinal direction.

According to the above configuration, when the plurality of optical fibers in the optical fiber ribbon are separated from each other, a length of each optical fiber separated in a tip region of the optical fiber ribbon is 10 mm or more. Thus, the optical fiber separated from the optical fiber ribbon by a sufficient length can be easily ensured. Further, since the length of the separated optical fiber is sufficient, when the optical fiber is rotated around the central axis, the twist occurring in the optical fiber can be moderated.

(5) The optical fiber ribbon according to item (1) or (2), further including: a dummy line disposed between the adjacent optical fibers, in which the dummy line and the adjacent optical fiber are intermittently bonded to each other in the longitudinal direction.

According to the above configuration, the adjacent optical fibers are prevented from coming into contact with each other. As described above, when the rotational alignment of the optical fiber is performed, the optical fiber is prevented from coming into contact with the adjacent optical fiber on which the rotational alignment has already been performed.

Furthermore, when the optical fiber splicing component such as an optical connector is manufactured using the optical fiber ribbon, the optical fibers and the dummy line can be easily separated. Further, when the optical fiber is rotated around the central axis, the twist occurring in the optical fiber can be moderated.

(6) The optical fiber ribbon according to item (5), in which the dummy line is made of the same resin material as the resin coating.

According to the above configuration, when the optical fiber splicing component such as an optical connector is manufactured using the optical fiber ribbon, the resin coating and the dummy line can be simultaneously removed in a step of exposing an end portion of each glass fiber from the resin coating.

(7) The optical fiber ribbon according to item (5) or (6), in which the dummy line and the adjacent optical fiber are intermittently bonded to each other at an interval of 10 mm or more in the longitudinal direction.

According to the above configuration, when the plurality of optical fibers and the plurality of dummy lines in the optical fiber ribbon are separated from each other, the length of each optical fiber separated in the tip region of the optical fiber ribbon is 10 mm or more. Thus, the optical fiber separated from the optical fiber ribbon by the sufficient length can be easily ensured. Further, since the length of the separated optical fiber is sufficient, when the optical fiber is rotated around the central axis, the twist occurring in the optical fiber can be moderated.

(8) The optical fiber ribbon according to any one of items (1) to (7), in which a variation in posture of each of the plurality of optical fibers around the central axis with respect to a virtual plane passing through the central axes of the plurality of optical fibers is within 30 degrees.

According to the above configuration, since a rotation amount of each optical fiber can be reduced when each optical fiber is rotationally aligned, the twist occurring in each optical fiber can be reduced. Further, since the torsion generated in each optical fiber becomes gentle, the length of each separated optical fiber (in other words, the length of the glass fiber exposed from the resin coating) can be shortened, and the length dimension of the optical fiber splicing component such as the optical connector can be moderated.

(9) An optical fiber splicing component using the optical fiber ribbon according to any one of items (1) to (8).

According to the above, the optical fiber splicing component having an improved optical characteristic can be provided.

(10) A method for manufacturing an optical fiber splicing component, including: a step of separating the plurality of optical fibers in the optical fiber ribbon according to any one of items (1) to (8); a step of exposing end portions of the plurality of glass fibers from the resin coating; a step of mounting the plurality of glass fibers exposed from the resin coating on a holding member; and a step of adjusting a posture of each of the plurality of optical fibers around the central axis.

According to the above configuration, the rotational alignment of each optical fiber (adjustment of the posture of each optical fiber around the central axis) can be performed with high accuracy. In particular, when the rotational alignment of the predetermined optical fiber is performed, the predetermined optical fiber is prevented from coming into contact with the adjacent optical fiber on which the rotational alignment has already been performed. In this way, it is possible to prevent the situation in which the posture of the adjacent optical fiber around the central axis (specifically, the position of the core on the end surface of the adjacent optical fiber) fluctuates. Accordingly, since the accuracy of the rotational alignment of the optical fiber can be increased, the method for manufacturing an optical fiber splicing component capable of improving the optical characteristic of the optical fiber splicing component is provided.

Advantageous Effects of Present Disclosure

According to the present disclosure, it is possible to provide an optical fiber ribbon capable of improving an optical characteristic of an optical fiber splicing component such as an optical connector.

Details of Embodiments

Hereinafter, embodiments of the present disclosure will be described with reference to the drawings. Ratios of dimensions of respective members illustrated in the drawings may be different from actual ratios of the dimensions of the respective members for convenience of description. Further, the same elements are denoted by the same reference numerals, and a repetitive description thereof will be omitted.

First Embodiment

Figure 1:
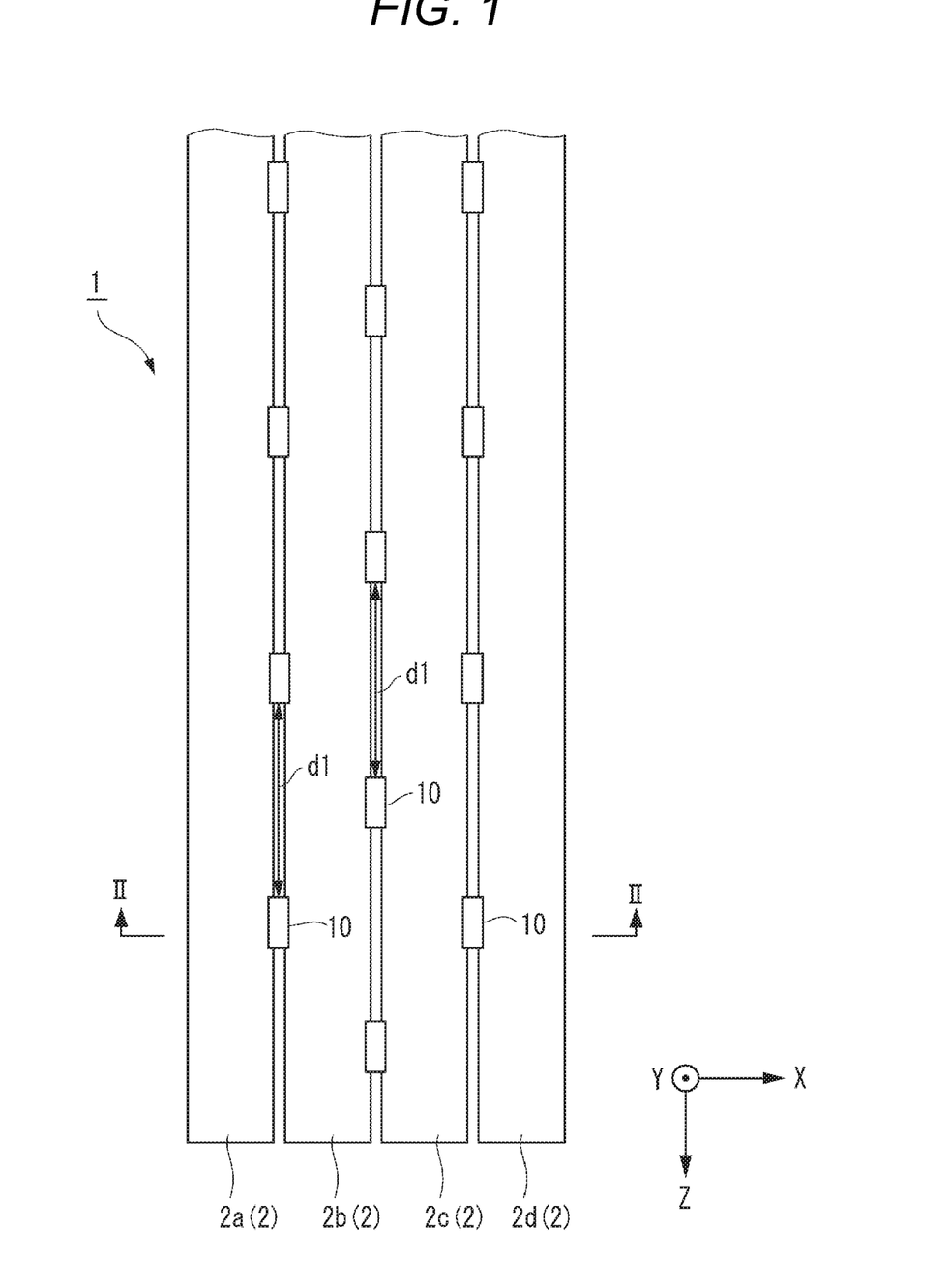
FIG. 1 is a plan view showing an optical fiber ribbon according to a first embodiment of the present disclosure.

FIG. 1 is a plan view showing an optical fiber ribbon 1 according to a first embodiment. The optical fiber ribbon 1 includes optical fibers 2a to 2d extending in a Z-axis direction. In the following description, the optical fibers 2a to 2d may be collectively referred to simply as optical fibers 2.

In this example, the optical fiber ribbon 1 includes four optical fibers 2, but the number of optical fibers 2 is not particularly limited. The optical fibers 2a to 2d are arranged in parallel in a direction (X-axis direction) orthogonal to a longitudinal direction (Z-axis direction) of the optical fiber 2. The optical fiber ribbon 1 is an optical fiber ribbon with fiber adhesive parts and non-adhesive parts. That is, the optical fibers 2 adjacent to each other are intermittently bonded with an adhesive 10 along the Z-axis direction.

In the optical fiber ribbon 1, positions in the Z-axis direction of the adhesives 10 provided between the optical fiber 2a and the optical fiber 2b adjacent to each other are different from positions in the Z-axis direction of the adhesives 10 provided between the optical fiber 2b and the optical fiber 2c adjacent to each other. Specifically, each of the adhesives 10 provided between the optical fiber 2b and the optical fiber 2c is positioned between the adhesives 10 adjacent to each other among the plurality of adhesives 10 provided between the optical fiber 2a and optical fiber 2b in the Z-axis direction.

The optical fibers 2 adjacent to each other are intermittently bonded to each other at an interval of 10 mm or more in the Z-axis direction. That is, a distance d1 between the adhesives 10 adjacent to each other in the Z-axis direction is 10 mm or more.

Figure 2:
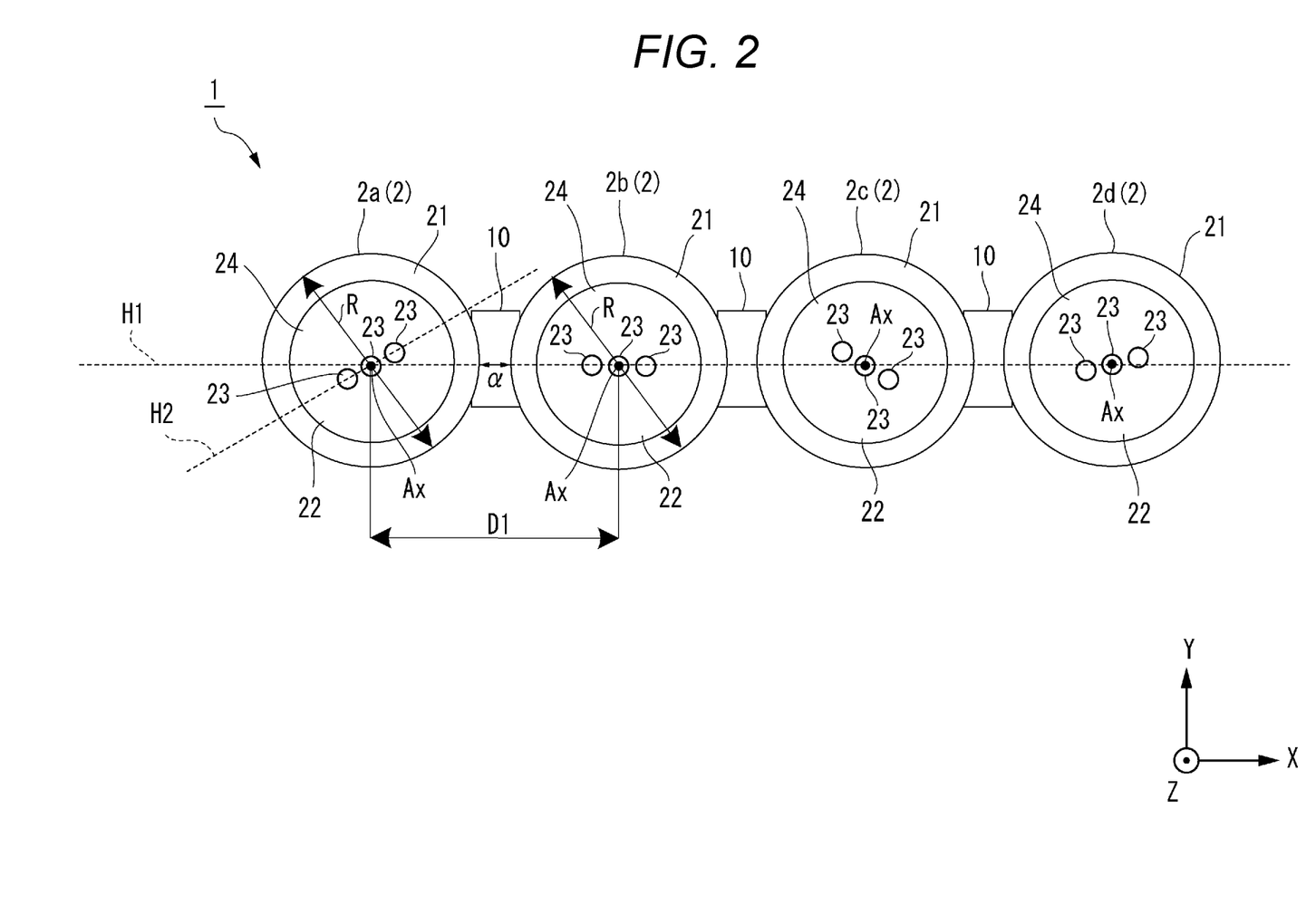
FIG. 2 is a cross-sectional view of the optical fiber ribbon taken along a line II-II in FIG. 1.

FIG. 2 is a cross-sectional view of the optical fiber ribbon 1 taken along a line II-II in FIG. 1. In FIG. 2, hatching representing a cross section is omitted for convenience of description. Each of the optical fibers 2 includes a glass fiber 22 and a resin coating 21 covering the glass fiber 22. The optical fibers 2 have structures which are substantially identical to one another in cross sections perpendicular to central axes Ax extending in the longitudinal direction (Z-axis direction) of the optical fibers 2 and are not axis-symmetric with respect to the respective central axes Ax, that is, structures which do not overlap with themselves except at a specific rotation angle. In the present embodiment, a multi-core fiber is used as an example of the optical fiber 2 having a structure that is not axis-symmetric with respect to the central axis Ax. As described above, since each of the optical fibers 2 has a non-axisymmetric structure with respect to the central axis Ax, a rotational alignment step of adjusting a posture of the optical fiber 2 around the central axis Ax is required. The glass fiber 22 includes a plurality of cores 23 through which signal light propagates and a cladding 24 covering the plurality of cores 23. A refractive index of each of the cores 23 is larger than a refractive index of the cladding 24.

In the optical fiber ribbon 1 according to the present embodiment, a variation in orientation of each optical fiber 2 around the central axis Ax with respect to a virtual plane H1 passing through the central axis Ax of each optical fiber 2 is within 30 degrees. For example, an angle between a reference line H2 of the optical fiber 2a (for example, a straight line connecting the central axis and a center of a specific core, or a straight line connecting centers of two or more specific cores) and the virtual plane H1 is within 30 degrees. The virtual plane H1 may be one of two parallel common tangential planes of the claddings 24 of the optical fibers 2, or may be a plane sandwiched between the two parallel common tangential planes and located at an equal distance from the two parallel common tangential planes. Further, outer diameters of the optical fibers 2 may be the same. In this case, the outer diameter of the optical fiber 2 is R.

A distance D1 between the central axes Ax of the optical fibers 2 adjacent to each other in the X-axis direction is larger than the outer diameter R of the optical fiber 2. When a distance of a gap between the optical fibers 2 adjacent to each other in the X-axis direction is $\alpha$, the distance D1 is expressed as $D1=R/2+\alpha+R/2=\alpha+R$. As described above, in the optical fiber ribbon 1 according to the present embodiment, the optical fibers 2a to 2d are arranged with the gap in the X-axis direction, and the adjacent optical fibers 2 are not in contact with each other.

(Method for Manufacturing Optical Fiber Splicing Component Including Optical Fiber Ribbon According to First Embodiment)

Figure 3:
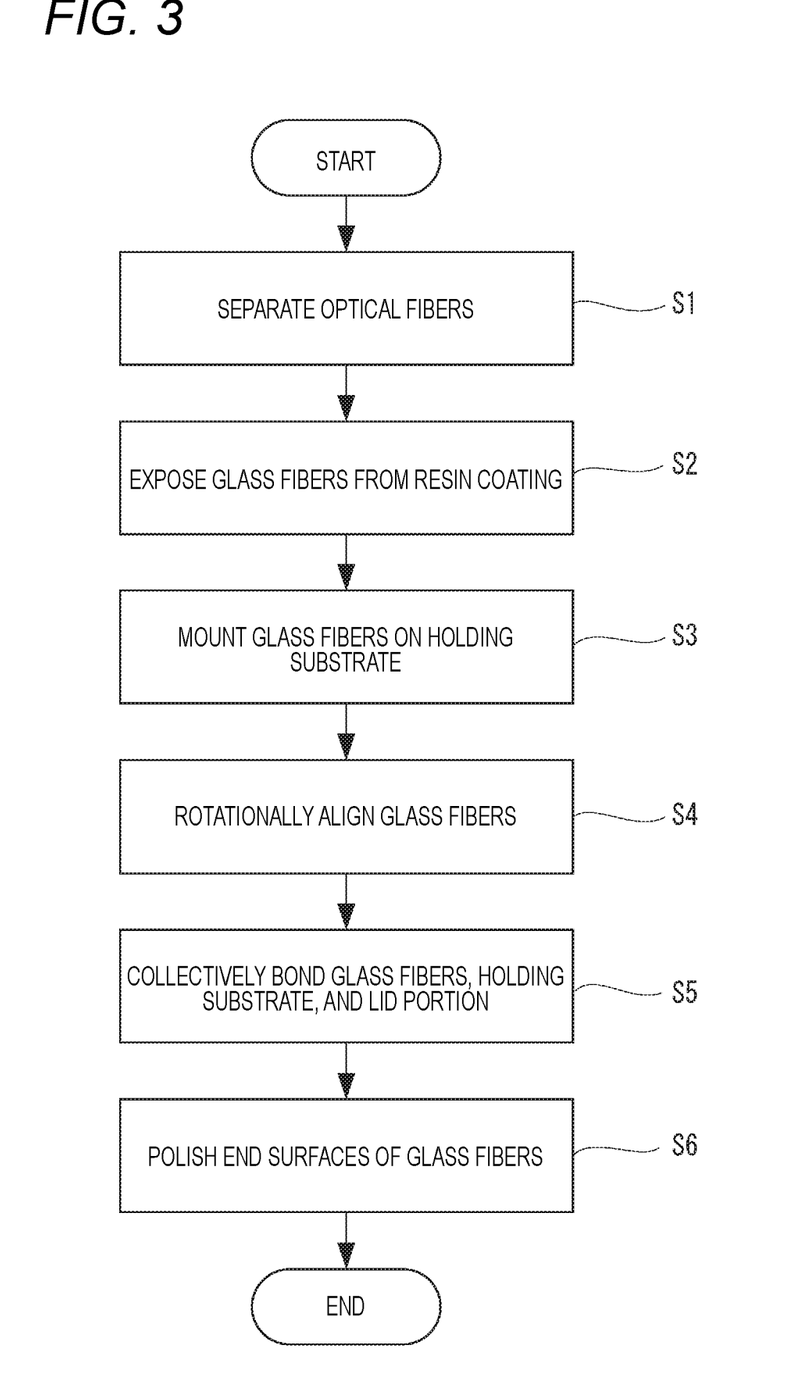
FIG. 3 is a flowchart illustrating an example of a method for manufacturing an optical fiber splicing component using the optical fiber ribbon.

FIG. 3 is a flowchart illustrating an example of a method for manufacturing an optical fiber splicing component 100 using the optical fiber ribbon 1. The optical fiber splicing component 100 functions as an optical fiber array including the plurality of optical fibers 2. When the optical fiber of the optical fiber splicing component 100 is optically spliced to another optical fiber, the optical fiber splicing component 100 functions as an optical connector. In step S1, the optical fibers 2a to 2d in the optical fiber ribbon 1 are separated from one another in a tip region K1 of the optical fiber ribbon 1. In the present embodiment, since the distance d1 between the adhesives 10 adjacent to each other in the Z-axis direction is 10 mm or more, a length of each of the optical fibers 2 separated in the tip region K1 of the optical fiber ribbon 1 is 10 mm or more. Therefore, the optical fiber 2 separated from the optical fiber ribbon 1 by a sufficient length can be easily ensured. Further, since the length of the separated optical fiber 2 is sufficient, when the optical fiber 2 is rotated around the central axis Ax, a twist occurring in the optical fiber 2 can be moderated.

Figure 4:
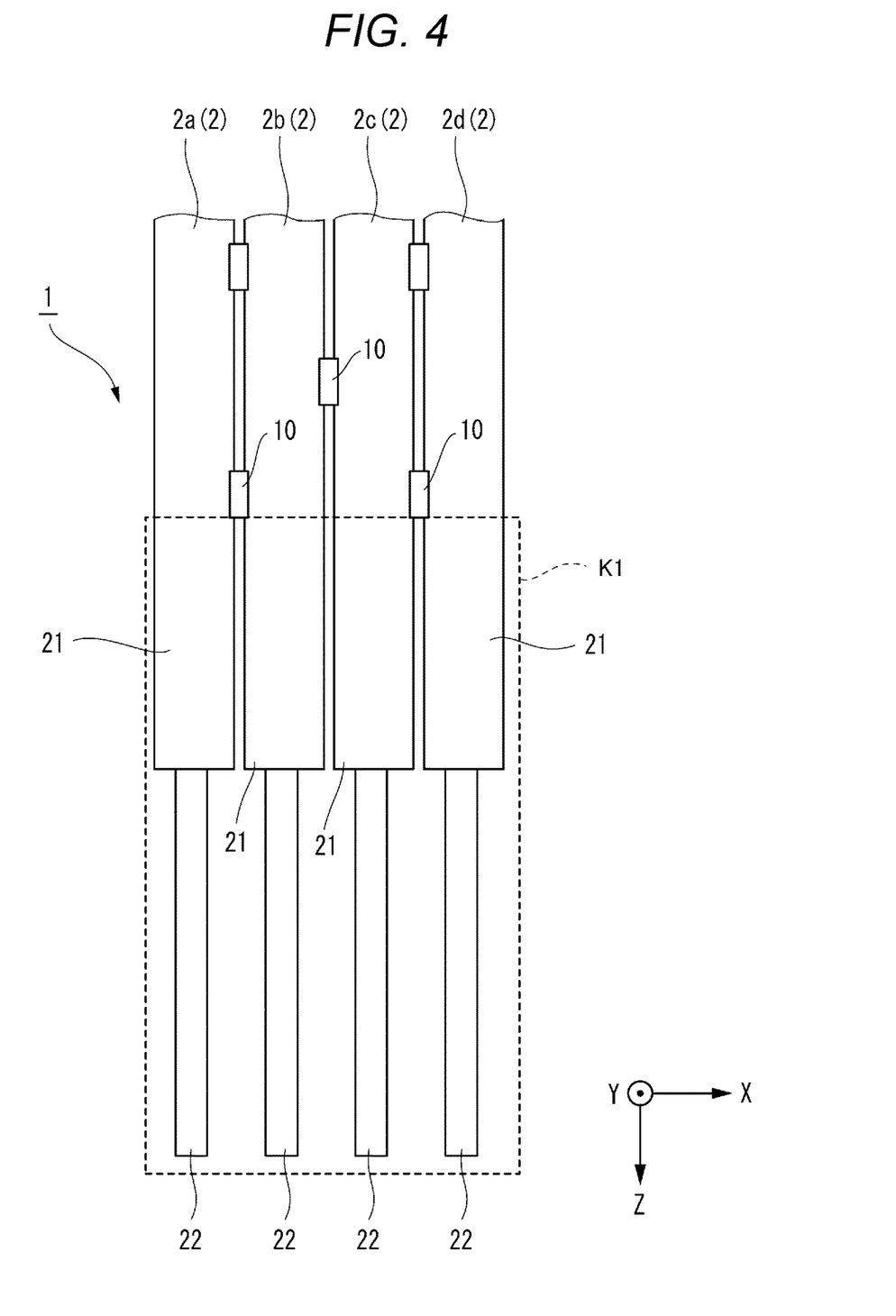
FIG. 4 is a plan view showing end portions of glass fibers exposed from a resin coating.

FIG. 4 is a plan view showing end portions of the glass fibers 22 exposed from the resin coating 21. In step S2, by using a predetermined tool, the end portion of the glass fiber 22 of each of the optical fibers 2 is exposed from the resin coating 21.

Figure 5:
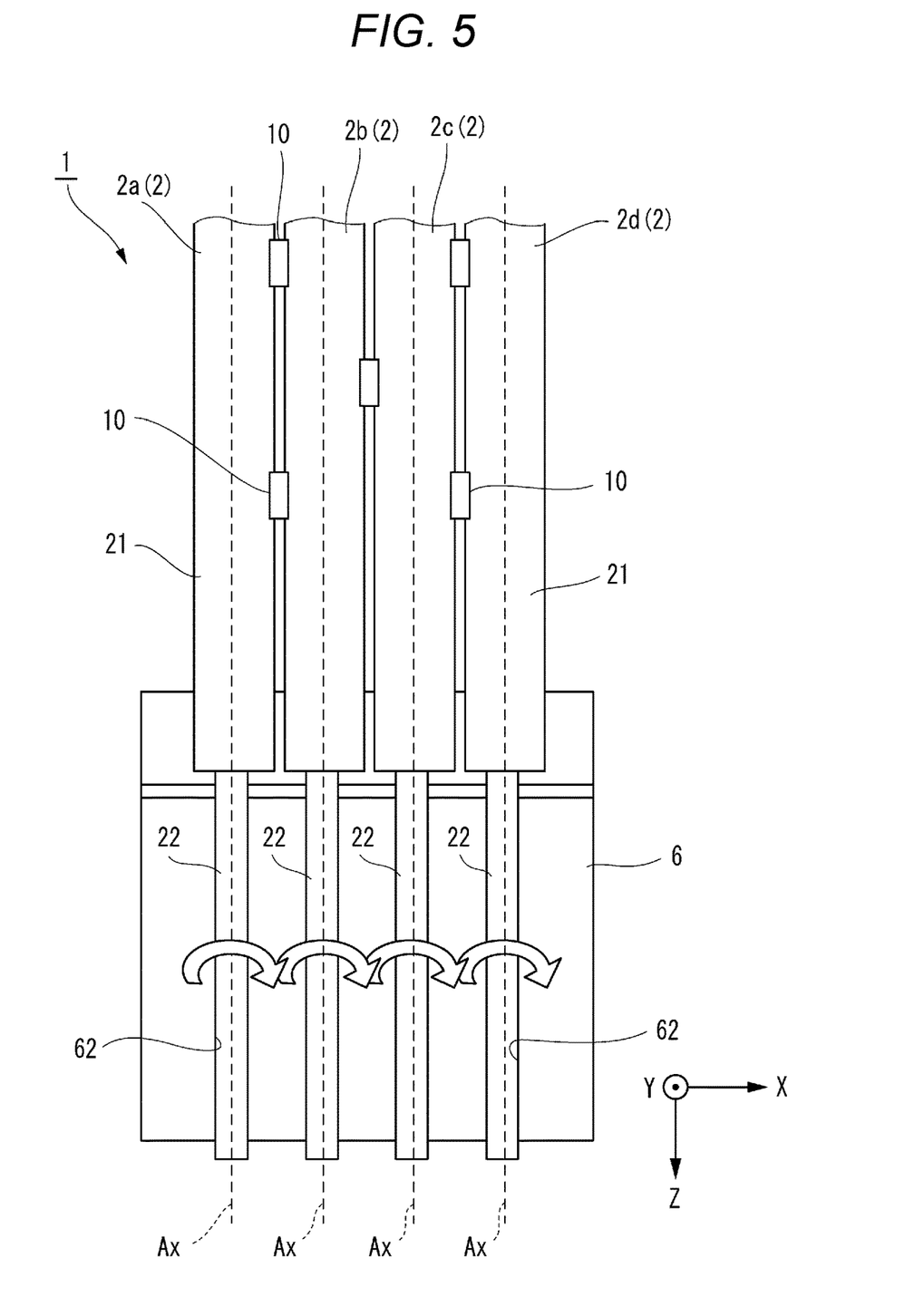
FIG. 5 is a view showing a state in which each glass fiber is rotationally aligned.

FIG. 5 is a view showing a state in which each of the glass fibers 22 is rotationally aligned. In step S3, each of the glass fibers 22 exposed from the resin coating 21 is mounted on a holding substrate 6. In particular, each of the glass fibers 22 is disposed in a corresponding one of a plurality of V-shaped groove portions 62 formed in the holding substrate 6. The glass fibers 22 are mounted on the holding substrate 6 such that the glass fibers 22 protrude outward from the holding substrate 6 in the Z-axis direction when arranged in the X-axis direction.

In step S4, a posture of each of the glass fibers 22 around the central axis Ax (in other words, a position of the core 23 on an end surface of the glass fiber 22) is adjusted. In the rotational alignment step of step S4, for example, the end surface of the glass fiber 22 protruding from the holding substrate 6 may be captured by an imaging device such as a camera. Thereafter, a rotational alignment device (not shown) may automatically adjust the posture of the glass fiber 22 around the central axis Ax based on a captured image indicating the end surface of the glass fiber 22 acquired by the imaging device. In this regard, the rotational alignment device adjusts the posture of the glass fiber 22 around the central axis Ax such that the position of the core 23 is a predetermined position.

In the optical fiber ribbon 1 according to the present embodiment, since there is a variation in posture of each optical fiber 2 around the central axis Ax, it is necessary to perform rotational alignment for each optical fiber 2. On the other hand, since the variation in posture of each optical fiber 2 around the central axis Ax is within 30 degrees, it is possible to reduce a rotation amount of each optical fiber 2 during the rotational alignment. As a result, it is possible to reduce an influence of the twist of each optical fiber 2 caused by the rotational alignment. Further, since the influence of the twist of each optical fiber 2 is reduced, the length of each separated optical fiber 2 can be shortened, and an increase in length dimension of the optical fiber splicing component 100 in the Z-axis direction can be prevented.

In the present embodiment, since the resin coatings 21 of the optical fibers 2 are arranged with a gap in the X-axis direction, the resin coatings 21 are not in contact with each other. Therefore, for example, the resin coating 21 of the optical fiber 2b is prevented from coming into contact with the resin coatings 21 of the adjacent optical fibers 2a and 2c during the rotational alignment of the optical fiber 2b. On the other hand, when the resin coating 21 of the optical fiber 2b comes into contact with the resin coating 21 of the optical fiber 2a during the rotational alignment of the optical fiber 2b, it is assumed that a posture around the central axis Ax of the optical fiber 2a on which the rotational alignment has already been performed fluctuates. As a result, a rotational position of the optical fiber 2a is shifted, and accuracy of the rotational alignment of the optical fiber 2a is lowered.

In the present embodiment, since the contact between the adjacent optical fibers 2 is prevented during the rotational alignment, it is possible to prevent the posture around the central axis Ax of the optical fiber 2 on which the rotational alignment has already been performed from fluctuating.

Figure 6:
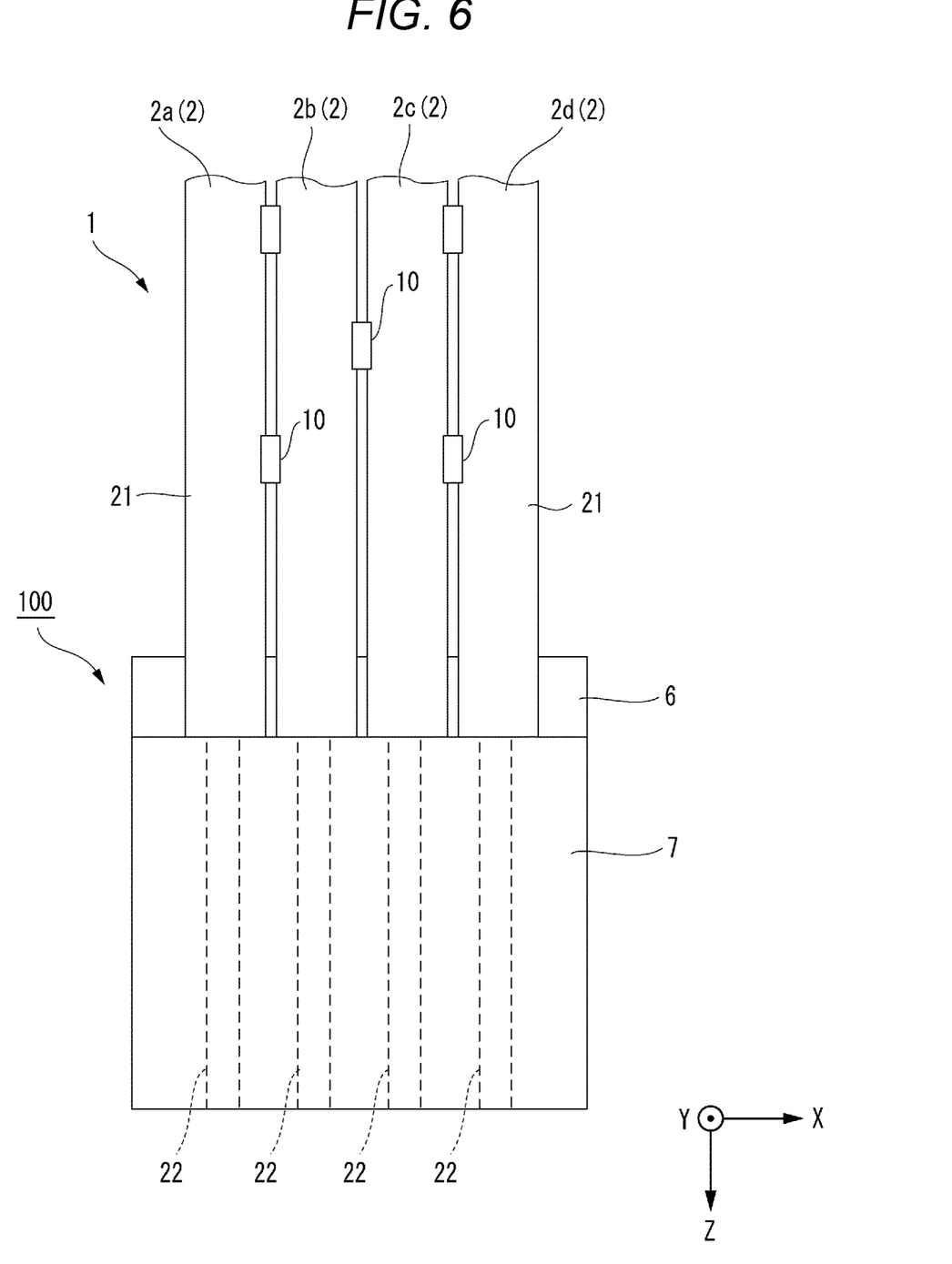
FIG. 6 is a plan view showing the optical fiber splicing component.

FIG. 6 is a plan view showing the optical fiber splicing component 100. In step S5, a lid portion 7 is disposed above the holding substrate 6. Each of the optical fibers 2 is sandwiched between the lid portion 7 and the holding substrate 6 in a Y-axis direction perpendicular to the X-axis and the Z-axis. Thereafter, the glass fibers 22, the holding substrate 6, and the lid portion 7 are collectively bonded with an adhesive.

Finally, in step S6, the end surfaces of the glass fibers 22 are polished. In particular, the end surfaces of the glass fibers 22 are polished such that the end surfaces of the glass fibers 22 are flush with an end surface of the lid portion 7 and an end surface of the holding substrate 6. In this way, the optical fiber splicing component 100 is manufactured using the optical fiber ribbon 1.

According to the present embodiment, when the optical fiber splicing component 100 such as an optical connector is manufactured using the optical fiber ribbon 1, the rotational alignment of each optical fiber 2 (adjustment of the posture of each optical fiber 2 around the central axis Ax) can be performed with high accuracy. In particular, when the rotational alignment of the predetermined optical fiber 2 is performed, the predetermined optical fiber 2 is prevented from coming into contact with the adjacent optical fiber 2 on which the rotational alignment has already been performed. In this way, it is possible to prevent a situation in which the posture around the central axis Ax of the optical fiber 2 (specifically, the position of the core 23 on the end surface of the optical fiber 2) on which the rotational alignment has already been performed fluctuates.

Therefore, it is possible to perform the rotational alignment of each optical fiber 2 with high accuracy, and an increase in coupling loss between the optical fiber splicing component 100 and another optical component (another optical connector and the like) is prevented. As described above, it is possible to provide the optical fiber ribbon 1 capable of improving an optical characteristic of the optical fiber splicing component 100.

In the present embodiment, since adjacent optical fibers 2 are intermittently bonded to each other in the Z-axis direction, when the optical fiber splicing component 100 is manufactured using the optical fiber ribbon 1, the optical fibers 2 can be easily separated. Further, when the optical fiber 2 is rotated around the central axis Ax, the twist occurring in the optical fiber 2 can be moderated.

Second Embodiment

Figure 7:
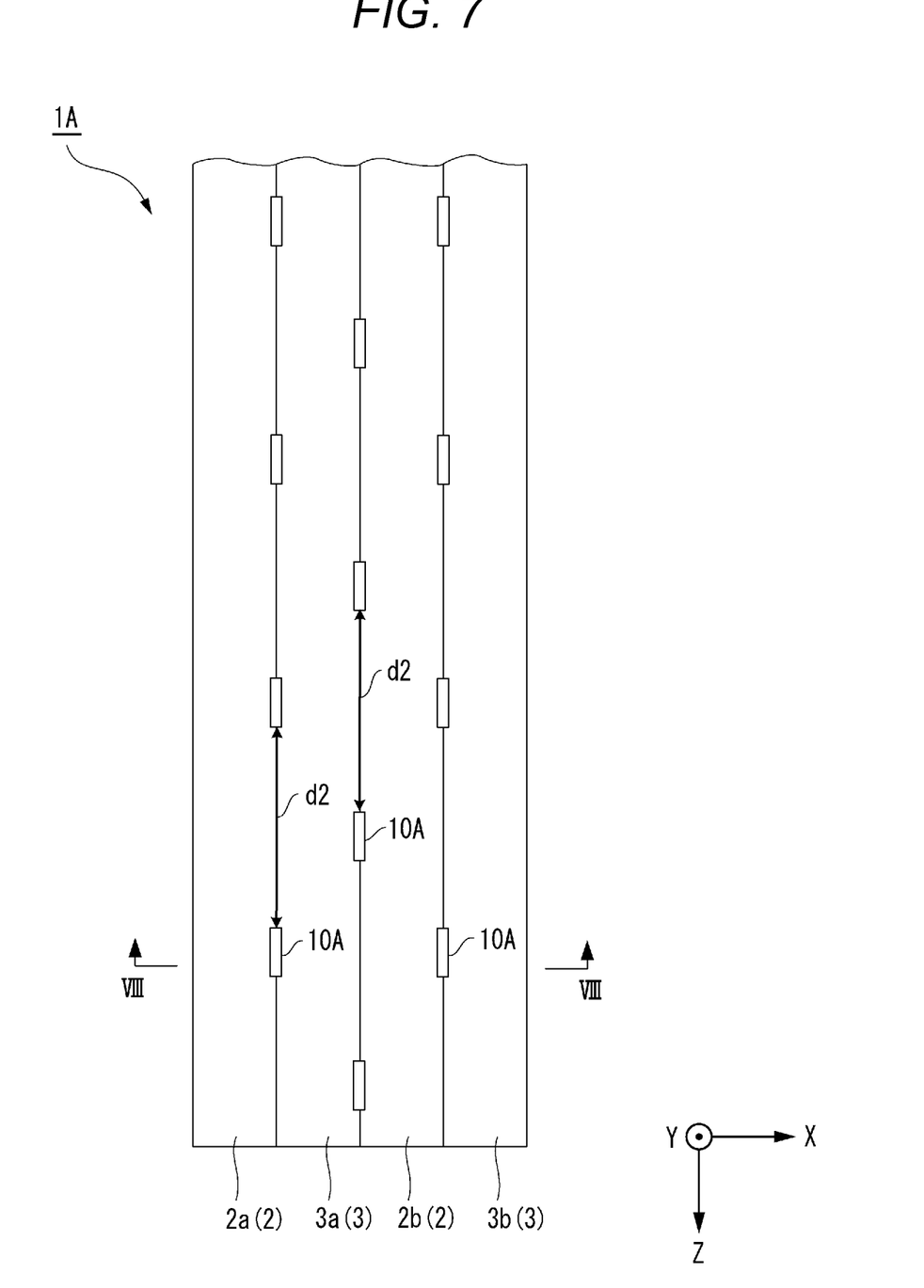
FIG. 7 is a plan view showing an optical fiber ribbon according to a second embodiment of the present disclosure.

FIG. 7 is a plan view showing an optical fiber ribbon 1A according to a second embodiment. The optical fiber ribbon 1A includes the optical fibers 2a and 2b extending in a Z-axis direction and dummy lines 3a and 3b. In the following description, the optical fibers 2a and 2b may be collectively referred to simply as the optical fibers 2, and the dummy lines 3a and 3b may be collectively referred to simply as dummy lines 3.

In this example, the optical fiber ribbon 1A includes the two optical fibers 2 and the two dummy lines 3, but the number of optical fibers 2 and the number of dummy lines 3 are not particularly limited. The optical fibers 2a and 2b and the dummy lines 3a and 3b are arranged in parallel in an X-axis direction orthogonal to a longitudinal direction (Z-axis direction) thereof. The optical fibers 2 and the dummy lines 3 are alternately arranged in the X-axis direction. Specifically, the dummy line 3a is disposed between the optical fiber 2a and the optical fiber 2b, and the optical fiber 2b is disposed between the dummy line 3a and the dummy line 3b.

The optical fiber ribbon 1A is an optical fiber ribbon with fiber adhesive parts and non-adhesive parts. That is, the optical fiber 2 and the dummy line 3 adjacent to each other are intermittently bonded to an adhesive 10A along the Z-axis direction.

In the optical fiber ribbon 1A, positions in the Z-axis direction of the adhesives 10A provided between the optical fiber 2a and the dummy line 3a adjacent to each other are different from positions in the Z-axis direction of the adhesives 10A provided between the dummy line 3a and the optical fiber 2b adjacent to each other. Specifically, each of the adhesives 10A provided between the dummy line 3a and the optical fiber 2b is positioned between the adhesives 10A adjacent to each other among the plurality of adhesives 10A provided between the optical fiber 2a and the dummy line 3a in the Z-axis direction.

The optical fiber 2 and the dummy line 3 adjacent to each other are intermittently bonded to each other at an interval of 10 mm or more in the Z-axis direction. That is, a distance d2 between the adhesives 10A adjacent to each other in the Z-axis direction is 10 mm or more.

Figure 8:
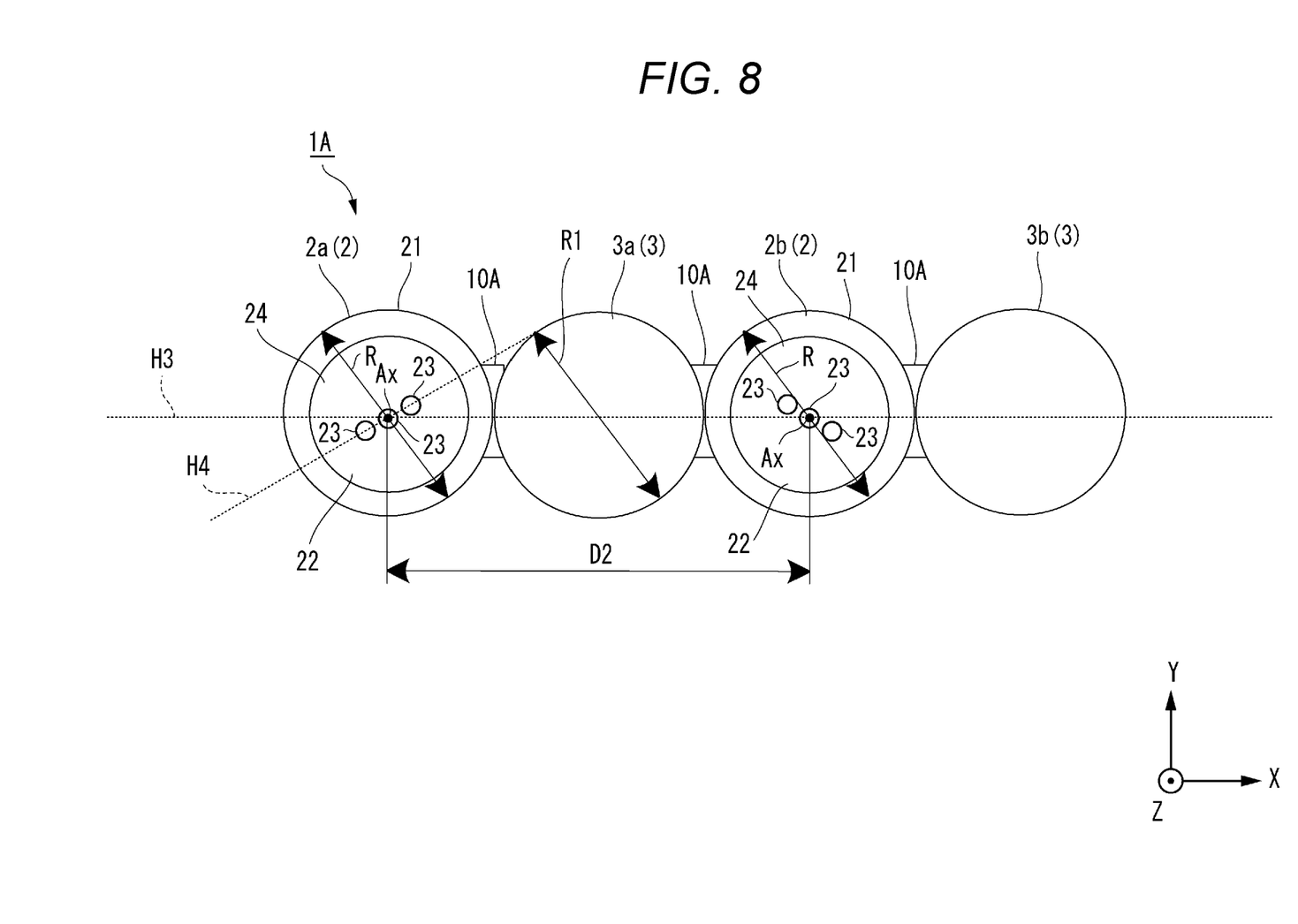
FIG. 8 is a cross-sectional view of the optical fiber ribbon taken along a line VIII-VIII in FIG. 7.

FIG. 8 is a cross-sectional view of the optical fiber ribbon 1A taken along a line VIII-VIII in FIG. 7. Hatching representing a cross section is omitted for convenience of description. In the optical fiber ribbon 1A according to the present embodiment, a variation in posture of each optical fiber 2 around the central axis Ax with respect to a virtual plane H3 passing through the central axis Ax of each optical fiber 2 is within 30 degrees. For example, an angle between a virtual plane H4 passing through centers of the plurality of cores 23 of the optical fiber 2a and the virtual plane H3 is within 30 degrees. Further, outer diameters of the optical fibers 2 may be the same. In this case, the outer diameter of the optical fiber 2 is R. Each of the dummy lines 3 is made of a resin material. In particular, each of the dummy lines 3 may be made of the same resin material as the resin coating 21 of the optical fiber 2. An outer diameter of the dummy line 3 is R1, and may be equal to the outer diameter R of the optical fiber 2.

A distance D2 between central axes Ax of the optical fiber 2a and the optical fiber 2b adjacent to each other in the X-axis direction is larger than the outer diameter R of the optical fiber 2. In particular, the distance D2 is expressed as D2=R/2+R1+R/2=R1+R. When the outer diameter R1 of the dummy line 3 is R, the distance D2 is 2R. As described above, in the optical fiber ribbon 1A according to the present embodiment, since the dummy line 3 is disposed between the optical fibers 2 adjacent to each other, the adjacent optical fibers 2 are not in contact with each other. On the other hand, the optical fiber 2 and the dummy line 3 adjacent to each other are in contact with each other.

(Method for Manufacturing Optical Fiber Splicing Component Including Optical Fiber Ribbon According to Second Embodiment)

In step S1 (FIG. 3), the optical fibers 2a and 2b and the dummy lines 3a and 3b in the optical fiber ribbon 1A are separated in a tip region K2 of the optical fiber ribbon 1A. In the present embodiment, since the distance d2 between the adhesives 10A adjacent to each other in the Z-axis direction is 10 mm or more, a length of each of the optical fiber 2 and the dummy line 3 separated in the tip region K2 of the optical fiber ribbon 1A is 10 mm or more. Therefore, the optical fiber 2 separated from the optical fiber ribbon 1A by a sufficient length can be easily ensured. Further, since the length of the separated optical fiber 2 is sufficient, when the optical fiber 2 is rotated around the central axis Ax, a twist occurring in the optical fiber 2 can be moderated.

Figure 9:
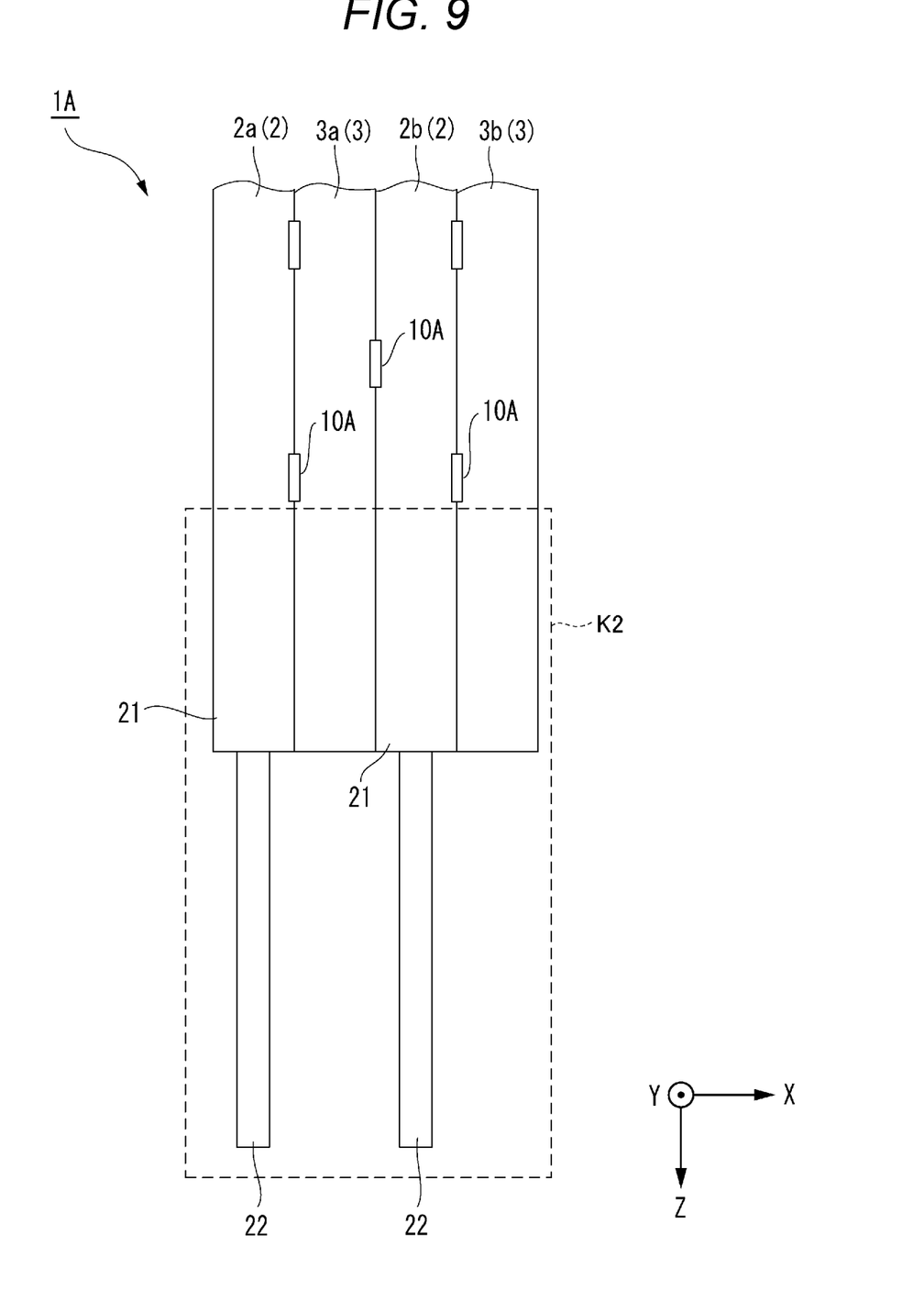
FIG. 9 is a plan view showing end portions of glass fibers exposed from a resin coating.

FIG. 9 is a plan view showing end portions of the glass fibers 22 exposed from the resin coating 21. In step S2, by using a predetermined tool, the end portion of the glass fiber 22 of each of the optical fibers 2 is exposed from the resin coating 21. At this time, when the dummy line 3 is made of the same resin material as the resin coating 21, an end portion of the dummy line 3 is also removed by the predetermined tool (for example, a thermal jacket remover) at the same time as the resin coating 21.

Figure 10:
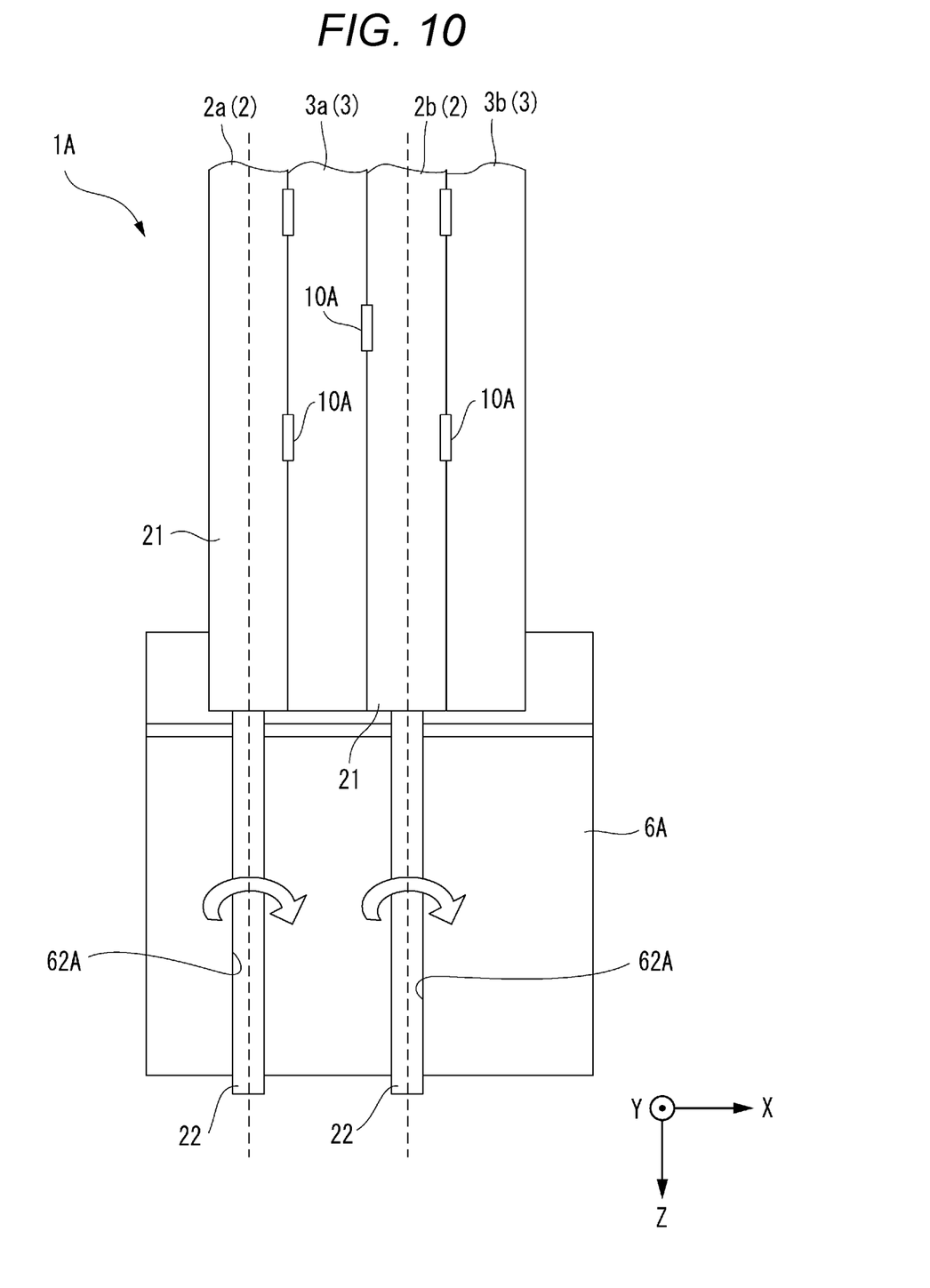
FIG. 10 is a view showing a state in which each glass fiber is rotationally aligned.

FIG. 10 is a view showing a state in which each of the glass fibers 22 is rotationally aligned. In step S3, each of the glass fibers 22 exposed from the resin coating 21 is mounted on a holding substrate 6A. In particular, each of the glass fibers 22 is disposed in a corresponding one of a plurality of V-shaped groove portions 62A formed in the holding substrate 6A. The glass fibers 22 are mounted on the holding substrate 6A such that the glass fibers 22 protrude outward from the holding substrate 6A in the Z-axis direction when arranged in the X-axis direction.

In step S4, a posture of each of the glass fibers 22 around the central axis Ax is adjusted. In the present embodiment, since the dummy line 3 is disposed between the optical fibers 2 adjacent to each other, the resin coatings 21 of the optical fibers 2 are not in contact with each other. Therefore, for example, the resin coating 21 of the optical fiber 2b is prevented from coming into contact with the resin coating 21 of the optical fiber 2a during the rotational alignment of the optical fiber 2b. In particular, when the resin coating 21 of the optical fiber 2b comes into contact with the resin coating 21 of the optical fiber 2a during the rotational alignment of the optical fiber 2b, it is assumed that a posture around the central axis Ax of the optical fiber 2a on which the rotational alignment has already been performed fluctuates. As a result, a rotational position of the optical fiber 2a is shifted, and accuracy of the rotational alignment of the optical fiber 2a is lowered.

On the other hand, in the present embodiment, since the contact between the optical fibers 2 adjacent to each other is prevented during the rotational alignment, it is possible to prevent the posture around the central axis Ax of the optical fiber 2 on which the rotational alignment has already been performed from fluctuating.

Figure 11:
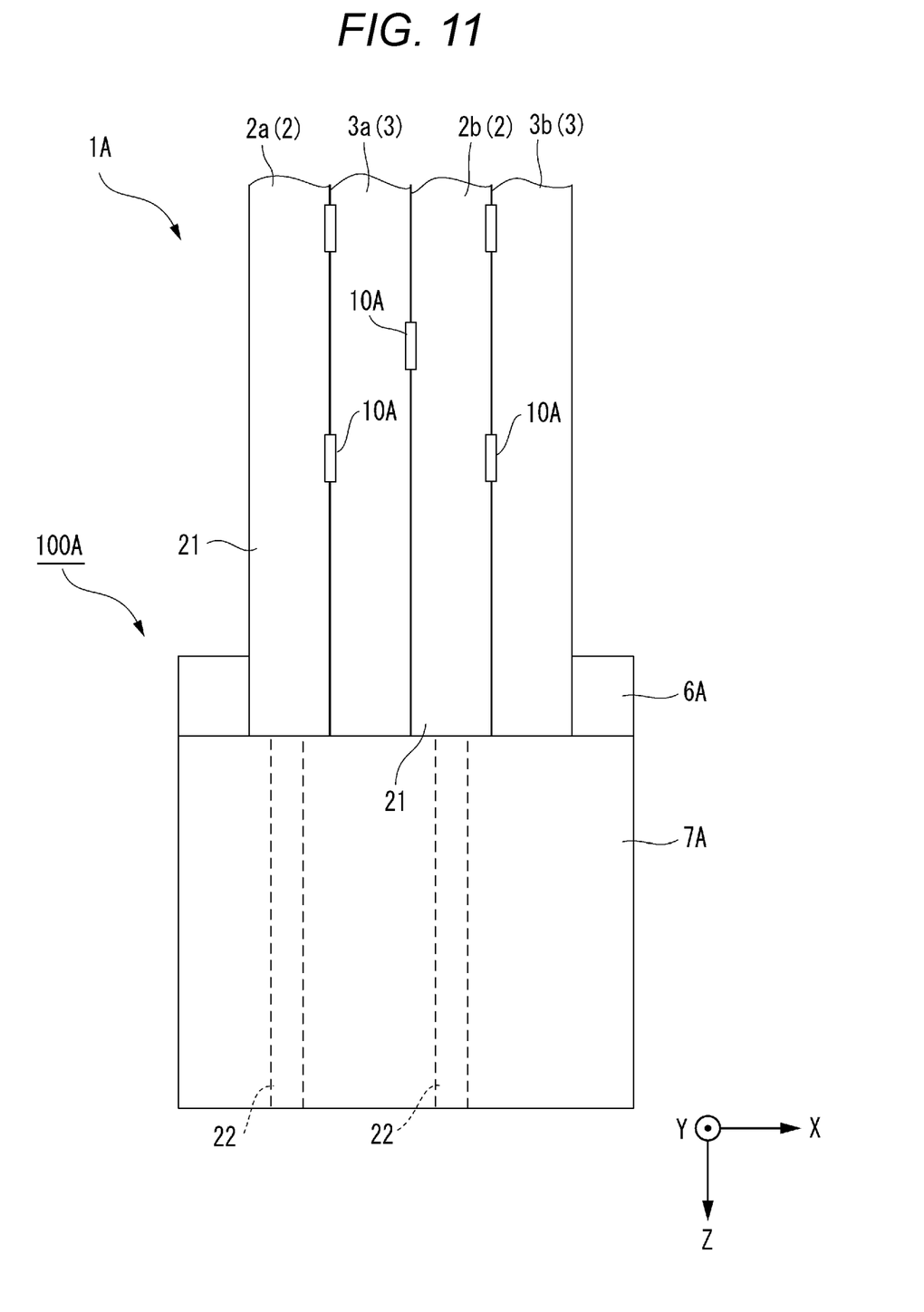
FIG. 11 is a plan view showing an optical fiber splicing component.

FIG. 11 is a plan view showing an optical fiber splicing component 100A. Next, in step S5, a lid portion 7A is disposed above the holding substrate 6A. Each of the optical fibers 2 is sandwiched between the lid portion 7A and the holding substrate 6A in the Y-axis direction perpendicular to the X-axis and the Z-axis. Thereafter, the glass fibers 22, the holding substrate 6A, and the lid portion 7A are collectively bonded with an adhesive. Finally, in step S6, end surfaces of the glass fibers 22, an end surface of the lid portion 7A, and an end surface of the holding substrate 6A are polished such that these end surfaces are flush. In this way, the optical fiber splicing component 100A is manufactured using the optical fiber ribbon 1A.

According to the present embodiment, when the optical fiber splicing component 100A such as an optical connector is manufactured using the optical fiber ribbon 1A, the rotational alignment of the optical fiber 2 can be performed with high accuracy. In particular, when the rotational alignment of the predetermined optical fiber 2 is performed, the predetermined optical fiber 2 is prevented from coming into contact with the adjacent optical fiber 2 on which the rotational alignment has already been performed. In this way, it is possible to prevent a situation in which the posture around the central axis Ax of the optical fiber 2 (specifically, a position of the core 23 on the end surface of the optical fiber 2) on which the rotational alignment has already been performed fluctuates. Therefore, it is possible to perform the rotational alignment of each optical fiber 2 with high accuracy, and an increase in coupling loss between the optical fiber splicing component 100A and another optical component (another optical connector and the like) is prevented. As described above, it is possible to provide the optical fiber ribbon 1A capable of improving an optical characteristic of the optical fiber splicing component 100A.

In the present embodiment, since the optical fiber 2 and the dummy line 3 adjacent to each other are intermittently bonded to each other in the Z-axis direction, when the optical fiber splicing component 100A is manufactured using the optical fiber ribbon 1A, the optical fiber 2 and the dummy line 3 can be easily separated. Further, when the optical fiber 2 is rotated around the central axis Ax, the twist occurring in the optical fiber 2 can be moderated.

When an interval between the adjacent glass fibers 22 in the X-axis direction is wide, the optical fiber splicing component 100A may be manufactured using the optical fiber ribbon 1A according to the second embodiment. On the other hand, when an interval between the adjacent glass fibers 22 in the X-axis direction is narrow, the optical fiber splicing component 100 may be manufactured using the optical fiber ribbon 1 according to the first embodiment.

Although the embodiments have been described above, it goes without saying that the technical scope of the present invention should not be construed as being limited by the description of the embodiments. It is to be understood by those skilled in the art that the embodiments are merely examples, and various modifications can be made within the scope of the inventions described in the claims. As described above, the technical scope of the present invention should be determined based on the scope of the inventions described in the claims and an equivalent scope thereof.

In the present embodiment, the multi-core fiber is used as an example of the optical fiber 2, and the optical fiber 2 may be a polarization maintaining fiber. The polarization maintaining fiber includes a pair of stress applying portions, a core disposed between the pair of stress applying portions and through which signal light propagates, and a cladding covering the pair of stress applying portions and the core. When the polarization maintaining fiber is used as the optical fiber 2, crosstalk between the optical fiber splicing component and another optical component optically spliced to each other can be reduced.

A holding member configured to hold the glass fibers 22 is not limited to a holding substrate having groove portions and a lid portion. For example, the holding member may be a hole capillary having a plurality of hole portions arranged in the X-axis direction. Each of the plurality of hole portions extends in the Z-axis direction and holds a corresponding one of the plurality of glass fibers 22. When the glass fibers 22 are held by the hole capillary, each of the glass fibers 22 is inserted into a corresponding one of the hole portions in step S3 shown in FIG. 3.

REFERENCE SIGNS LIST 1, 1A optical fiber ribbon
2, 2a, 2b, 2c, 2d optical fiber
3, 3a, 3b dummy line
6, 6A holding substrate
7, 7A lid portion
10, 10A adhesive
21 resin coating
22 glass fiber
23 core
24 cladding
62, 62A groove portion
100, 100A optical fiber splicing component

The invention claimed is:

1. An optical fiber ribbon comprising:
a plurality of optical fibers each including a glass fiber including a plurality of cores and a cladding covering the plurality of cores, and a resin coating covering the glass fiber, the plurality of optical fibers being arranged in parallel,
wherein a distance between central axes of adjacent optical fibers among the plurality of optical fibers in a direction orthogonal to a longitudinal direction of the plurality of optical fibers is larger than an outer diameter of each of the plurality of optical fibers,
wherein a respective reference line that passes through centers of two or more cores of the plurality of cores is different between the adjacent optical fibers; and
a dummy line disposed between the adjacent optical fibers,
wherein the dummy line and the adjacent optical fibers are intermittently bonded to each other in the longitudinal direction, and
wherein the dummy line and the adjacent optical fibers are structurally different from each other.

2. The optical fiber ribbon according to claim 1, wherein the dummy line is made of a same resin material as the resin coating.

3. The optical fiber ribbon according to claim 1, wherein the dummy line and the adjacent optical fiber are intermittently bonded to each other at an interval of 10 mm or more in the longitudinal direction.

4. The optical fiber ribbon according to claim 1, wherein a variation in posture of each of the plurality of optical fibers around a respective central axis with respect to a virtual plane passing through the central axes of the plurality of optical fibers is within 30 degrees.

5. An optical fiber splicing component using the optical fiber ribbon according to claim 1.

6. A method for manufacturing an optical fiber splicing component, comprising:
separating the plurality of optical fibers and the dummy line in the optical fiber ribbon according to claim 1;
exposing end portions of the plurality of glass fibers from the resin coating;
mounting the plurality of glass fibers exposed from the resin coating on a holding member; and
adjusting a posture of each of the plurality of optical fibers around the central axis.

* * * * *